United States Patent [19] [11] 4,138,959
Rumball [45] Feb. 13, 1979

[54] PRODUCTION OF COMPOSITE ARTICLES

[75] Inventor: Kenneth F. Rumball, Great Bookham, England

[73] Assignee: Airfix Industries Limited, London, England

[21] Appl. No.: 752,614

[22] Filed: Dec. 20, 1976

[30] Foreign Application Priority Data

Dec. 29, 1975 [GB] United Kingdom ............... 53037/75

[51] Int. Cl.² ............................................. F01B 7/20
[52] U.S. Cl. ..................................... 113/1 G; 113/16; 113/120 K; 93/51 R
[58] Field of Search .............. 113/1 E, 1 F, 1 G, 115, 113/7 R, 7 A, 16, 120 K, 120 R; 425/468; 93/51 R; 72/327, 329, 351, 330

[56] References Cited

U.S. PATENT DOCUMENTS

| | | | |
|---|---|---|---|
| 1,842,189 | 1/1932 | Muller | 93/51 R |
| 2,304,582 | 12/1942 | Lyon | 72/351 |
| 2,350,884 | 6/1944 | Ernst | 72/351 X |
| 2,398,200 | 4/1946 | Voorhis | 93/51 R |
| 3,336,117 | 8/1967 | Borello | 72/329 X |
| 3,868,893 | 3/1975 | Sutch | 93/51 R X |

Primary Examiner—Leon Gilden
Attorney, Agent, or Firm—Scrivener, Parker, Scrivener & Clarke

[57] ABSTRACT

Apparatus for making a container for example a frusto-conical container from a blank having an end panel and side panels, the apparatus having a cavity tool and a core between the blank can be clamped in the form which it takes in the finished article, and a blank positioning member movable relative to the tools which, as the tools move toward a closed condition to clamp the blank will engage a free edge of the blank already in its final axial position in the cavity tool to correctly position that edge before the tools reach the closed condition.

5 Claims, 3 Drawing Figures

PRODUCTION OF COMPOSITE ARTICLES

This invention is concerned with improvements in and relating to apparatus for making composite articles that is to say articles which comprise a blank of flexible sheet material such as paper, board, plastics, or metal foil, which is folded to the desired shape of the article and is seamed by injection moulding whilst the folded material is clamped between mould tools.

In U.S. Pat. No. 3,868,893, assigned to same assignee as the present application there is described and shown machinery for making a container from a blank which comprises a base panel and two side panels which extend from opposite points of the base panel. In that application the machinery includes a core tool and a cavity tool, the latter being shown as a split tool. A container may however be made using a solid cavity tool. The election of a split tool or a solid tool for the cavity is determined by the existence or otherwise of undercuts on the container to be formed and/or the degree of conicity.

A blank for containers to be produced on similar machinery is shown and described in U.S. Pat. No. 3,931,385, also assigned to the same assignee. In the blanks described in that application each side panel is coupled to the base panel by two hinge portions. In another arrangement each side panel may be coupled to the base panel along a straight line fold, which may be perforated, in which case the core tool has flats adjacent the end face where the blank may be folded. In either case, if a solid cavity tool is used, that is solid at least adjacent the closed end of the tool, the blank is driven into the cavity tool by a protruding mushroom on the leading face of the core tool. This allows the blank to reach its final axial position in the cavity tool before the core tool has reached its blank clamping position in the cavity tool. Because the blank is only held in the cavity tool by the mushroom there may be a degree of displacement of a side panel relative to the base panel not only about the desired hinge axis or axes but in a manner which results in the free edges of the side panel lying in planes which are not parallel with the plane of the base panel in the folded condition of the blank.

According to one aspect of the present invention there is provided apparatus for making composite articles, the apparatus comprising a cavity tool and a core tool movable relative to one another between an open condition in which an end panel of a blank may be positioned between the tools and a closed condition in which the end panel and side panels of the blank are clamped between the cavity tool and the core tool, the apparatus further including a blank positioning member movable relative to the core tool and to the cavity tool, which member will during closing movement of the tools serve to engage before the tools reach their closed position a blank which has been positioned in the cavity tool at a point on an edge of the blank which in the folded condition of the blank is directed away from the cavity tool to correctly position that edge before the core tool reaches its closed condition relative to the cavity tool and with the cavity tool clamps the blank.

Features and advantages of the present invention will appear from the following description of some embodiments, given by way of example only, reference being had to the accompanying drawings in which.

Figure 1:
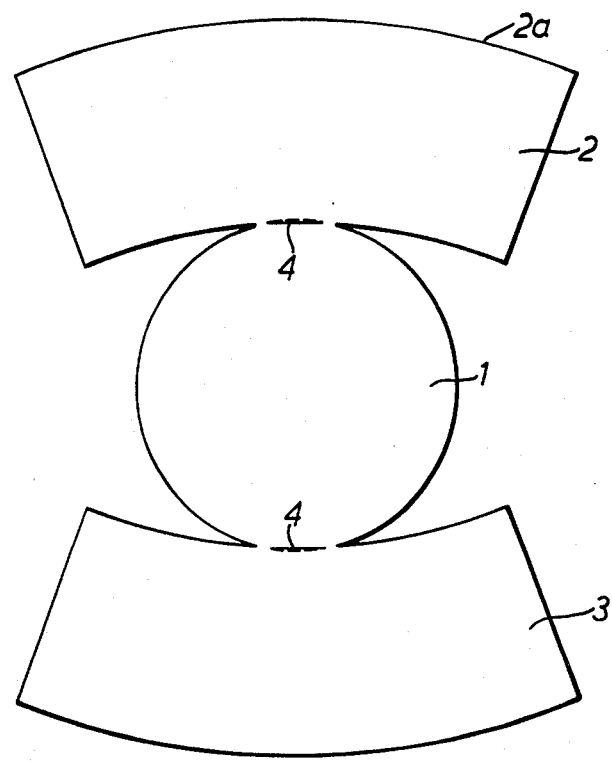
FIG. 1 is a plan view of a blank.

A blank is illustrated in FIG. 1 for producing a composite container which is of frusto-conical form. This blank comprises a base panel 1 and two side panels 2, 3 which are coupled to the base panel at rectilinear fold lines 4 which in this instance are perforated. To make up a container from this blank the blank is positioned between a core tool and a cavity tool when those tools are in the open condition.

Figure 2:
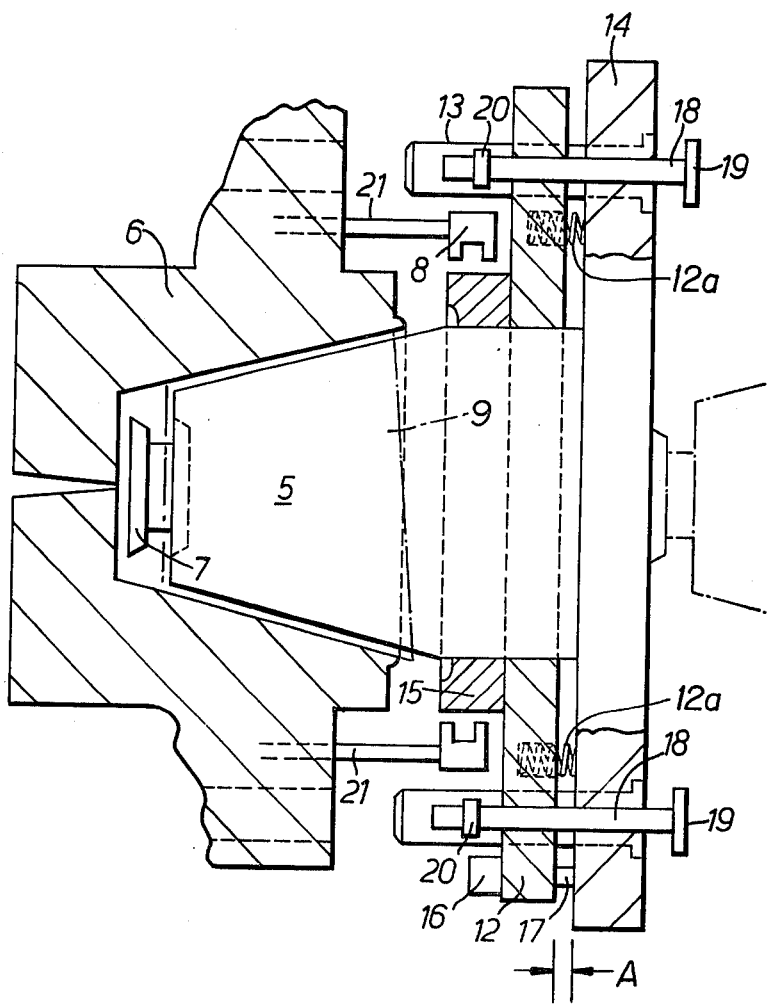
FIG. 2 is a diagrammatic horizontal section through a core tool and a cavity tool.

Referring to FIG. 2, there is shown a core tool 5 and a cavity tool 6. The cavity tool is a solid tool along its axial length as here shown and the core tool includes a mushroom 7 movable relative to the core tool between an advanced condition (as illustrated) and a retracted condition in which the mushroom forms part of the leading free of the core tool. As illustrated in FIG. 2, the tools are approaching the closed condition and the mushroom is still in its advanced state. When the tools are in the open condition, the core tool would be at the position indicated by chain dot line in FIG. 2 and a blank can then be fed downward by gravity along a pair of channel section guide rails 8 with the side panels above and below the base panel. Stops will halt the blank in its travel down the guide rails when the base panel is opposite the mushroom of the core tool. When the tools move toward the closed condition the mushroom engages the base panel and drives it into the cavity tool. When the base panel reaches the base of the cavity tool the core tool has not yet reached its final closed condition.

Figure 3:
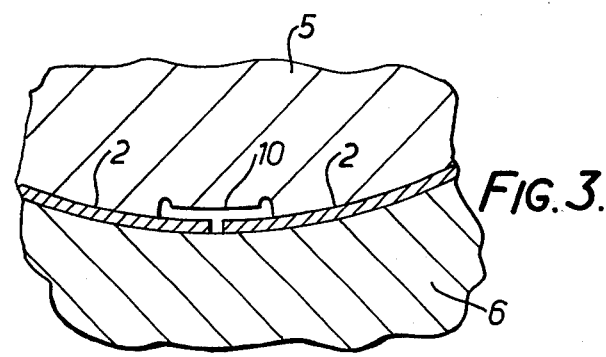
FIG. 3 is a diagrammatic vertical cross section of a core tool and cavity tool.

Because of the relatively weak connection between each side panel and the base panel it is possible that the free edge e.g. 2a of a side panel 2 may be in an attitude, when the base panel reaches the base of the cavity tool, in which that edge is in a plane out of parallel with the plane of the base panel. Thus, as shown in FIG. 2, the free edge of a side panel could conceivably be in the attitude indicated by the broken line 9. If this is not corrected, then in the final article, injected material at the lip of the container may be very thin where the edge of the side panel is furthest from the base panel than it should be and this thin region will be a weakness in the final product. Additionally, if a side panel is in such an attitude it does not follow that the other side panel is in a similar attitude and therefore juxtaposed edges may be out of parallel. Indeed, the other side panel might be oppositely orientated so that at some point along one pair of juxtaposed edges the side panels might overlap or become butted and those butted edges may project radially inwardly into the region of the seam channel 10 provided in the core tool for production of the seam for joining those edges. Referring to FIG. 3, the core tool is again illustrated at 5 and the cavity tool at 6. The side panels are indicated at 2 and 3 and a seam channel is shown at 10, this seam channel being in the core tool and spanning the juxtaposed edges of the side panels 2, 3. As mentioned, if the juxtaposed edges are forced into an abutting condition they may well turn inwardly into the seam channel and if this occurs a seam of reduced thickness may result at the region of the inturned edge or edges and again a weakness will result.

Referring again to FIG. 2, in order to overcome this difficulty there is provided a plate 12 carried by pins 13 on the core base plate 14. The plate 12 carries a ring 15 which will complete, as illustrated, a mould cavity at the lip of the container. The plate 12 is biassed by springs (12a) so as to be urged away from the plate 14 when the tools are in the open condition and so as to be spaced from plate 14 as indicated by arrows A. When the tools move toward the closed condition, the mushroom will drive the base panel 1 to the base of the cavity tool. At that stage the core tool will not yet have 7 Further travel of plate 14 will next bring ring 15 to its closed condition.

Accordingly, if one or other of the side panels is incorrectly positioned in the cavity tool by the mushroom when the ring 15 arrives at its closed condition, that ring will engage the edge of that side panel which is directed away from the cavity tool and drive it into its proper attitude which it can do because the core tool has not yet arrived at its closed condition. Finally the plate 14 will complete its travel, driving the core to its closed condition and taking up the gap between plate 12 and plate 14.

At present it is preferred that the plate 12 is provided at opposite corners with fluid operated rams, one of which is indicated at 16, whose pistons 17 form stops against which base plate 14 will bear during closing movement. These rams move plate 12 on the four pins 13 set in base plate 14. To separate the plate 12 from base plate 14 during opening, two pins 18, on a horizontal plane, having traction heads 19 and traction collars 20, will pull the plate 12 away from the cavity tool after the base plate has moved a predetermined distance.

The channel section rails 8 are carried by cross members, not shown, and the resultant frame is carried on four pins 21 received in guides in the cavity tool, two of the pins constituting pistons by means of which the guide rail frame is positioned away from the cavity tool for positioning a blank when the tools are open. As the tools close the core tool drives the base panel of the blank out of the plane of the rails to initiate folding of the blank. As the tools move further toward the closed condition plate 12 engages the guide rail frame and moves it toward the cavity tool to allow ring 15 and the core tool to close the cavity.

By means of the embodiment described above, the edges of a blank at the open end of the container can be brought to an accurate position and correct orientation resulting in economy of injected material, and more uniformly consistent seams and a more accurate lip.

The seaming channel 10 is preferably of the shape shown for reasons described in U.S. Pat. No. 4,001,471 assigned to the same assignee as the present application.

It will be appreciated that the above described ring 15 may also be provided in a split tool such as described in previously mentioned U.S. Pat. No. 3,868,893.

I claim:

1. Apparatus for making a composite article from a planar blank of sheet material which blank includes an end panel and a side panel which are foldable relative to one another from the planar condition to the relative positions which they will occupy in the completed article, the apparatus comprising a cavity tool having an inner end at the closed end of said tool and an outer end face at the open end of said tool, a core tool having inner and outer ends and being movable relative to the cavity tool from an open condition to a closed condition in which it is received through said open end of the cavity tool in clamping relationship therewith, a blank side panel positioning member between the cavity tool and core tool outer end and which is movable relative to the core tool and to the cavity tool between an open condition wherein said positioning member is spaced from the outer end face of said cavity tool, and a closed condition wherein the positioning member abuts the said outer end face of the cavity tool, blank locating means for locating a blank in generally planar condition between the cavity tool and positioning member with the end panel opposite the inner end of the core tool, means for moving the core tool and positioning member to a position in which the inner end of the core tool is within the cavity tool but is spaced from the closed end thereof out of clamping relationship therewith and in which the positioning member is in its closed condition in abutment with the outer end face of the cavity tool, said positioning member in its closed position being located so as to be engageable with an edge of a side panel of a blank remote from and directed away from the inner end of the core tool to maintain said side panel in proper attitude relative to the end panel before the blank is clamped between the core and cavity tools, and means for moving the core tool relative to the positioning member and to the cavity tool to complete the closing of those tools into clamping relationship with each other.

2. Apparatus according to claim 1 in which the blank side panel positioning member is carried on guide means extending parallel with the path of relative closing movement of the core tool and cavity tool, the blank side panel positioning member being positioned on the guide means relative to the core tool, when the tools are open, in advance of its position relative to the core tool when the tools are in the closed condition in order that said member will reach a closed position relative to the cavity tool after the core tool enters the cavity tool but before the core tool reaches its closed condition relative to the cavity tool.

3. Apparatus according to claim 2 in which the blank side panel positioning member is positioned relative to the core tool during closing movement of the tools by retractable fluid operated stops.

4. Apparatus according to claim 2 in which the blank side panel positioning member, the cavity tool and the core tool define a mould cavity.

5. Apparatus according to claim 1 in which a member is carried by the core tool which is movable between an extended portion and a retracted position relative to an end face of the core tool the member being in the extended condition as the tools move to the closed position to drive an end panel of the blank to the closed end of the cavity tool before the tools reach the closed condition and thereafter retracting to allow the tools to close.

* * * * *